Aug. 16, 1960 R. BAUER 2,949,254
HELICOPTER STRUCTURES
Filed April 29, 1955 3 Sheets-Sheet 1

INVENTOR
RICHARD BAUER

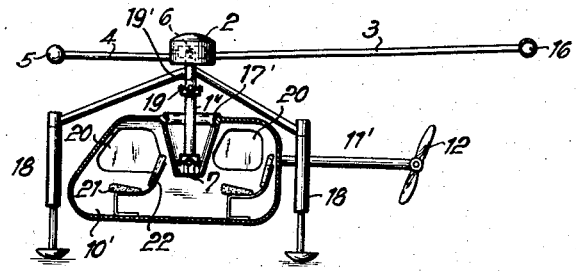
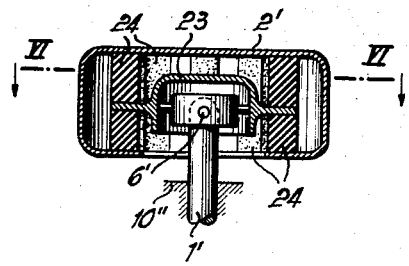
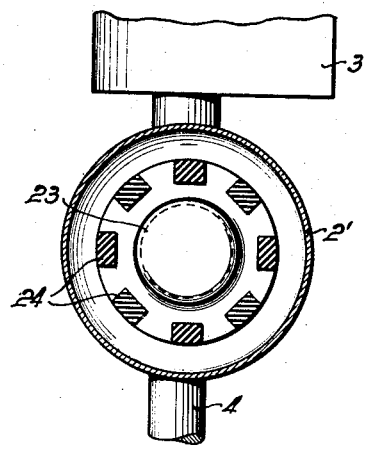

Aug. 16, 1960                R. BAUER                2,949,254
                        HELICOPTER STRUCTURES
Filed April 29, 1955                                  3 Sheets-Sheet 3

INVENTOR.
RICHARD BAUER
BY

United States Patent Office 2,949,254
Patented Aug. 16, 1960

2,949,254

HELICOPTER STRUCTURES

Richard Bauer, Prinzstrasse 16, Augsburg, Germany

Filed Apr. 29, 1955, Ser. No. 504,731

4 Claims. (Cl. 244—17.27)

This invention relates to heavier-than-air craft and more particularly to helicopters with a one-blade rotor.

It is an object of the present invention to provide means facilitating flight in heavier-than-air craft of the helicopter type both for purposes of passenger and freight transport in a smooth and substantially jolt-free manner.

It is another object of the present invention to provide means ensuring maximum comfort and ease of transport for passengers of a helicopter through prevention of undesirable and deleterious vibrating and jarring of the helicopter due to dynamic unbalance of the rotor.

It is still another object of the present invention to provide means affording a greatly improved and highly efficient helicopter or like heavier-than-air craft provided with a single blade rotor, which rotor is so constructed as to eliminate the asymmetrical play of forces resulting from rotation of said rotor.

Yet another object of the present invention is to provide means affording a novel and extremely efficacious helicopter in which the cabin or body and the tail assembly of said helicopter are effectively suspended from the main rotor-assembly of said helicopter in a manner permitting relative swinging movement between at least said cabin and said rotor assembly.

A further object of the invention is to provide means conducive to facile and continuous control and regulation of the above-mentioned relative swinging movement between said rotor assembly and at least said cabin, such control being advantageously effected by suitable elastic means or motion limiting arrangements.

It is generally known in aircraft constructions of this type that rotation of the rotor causes to be imparted to the cabin or body of the craft and to the parts connected therewith undesirable and deleterious oscillations, jars, and shocks due to the asymmetrical play of forces resulting from said rotation. This, of course, is very uncomfortable for passengers in the cabin and is, moreover, inimical to the structural elements of the craft. It is for this reason that helicopters with a rotor consisting of only a single blade have not heretofore found universal acceptance.

It is, therefore, a further object of the present invention to eliminate the above-mentioned defects by preventing the arising of such structure-weakening vibrations or oscillations especially in the passenger space or cabin. This end is attained by means of the aforesaid adjustable mounting of the rotor relative to the cabin and its associated parts.

More particularly the invention contemplates provision of a helicopter or like heavier-than-air craft with a single blade rotor in which the rotor is movable as a unit relative to the cabin or a part thereof in such a manner that at least one of the components of such movement lies in or parallel to the plane in which the rotating rotor blade moves.

The invention will be more fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In the drawings:

Fig. 4 is a side view of still another modification of a helicopter according to the present invention;

Fig. 5 is a partial sectional view of a rotor hub according to yet another modification of the present invention;

Fig. 6 is a sectional view of the hub of Fig. 5, the view being taken along line VI—VI.

Figure 1:
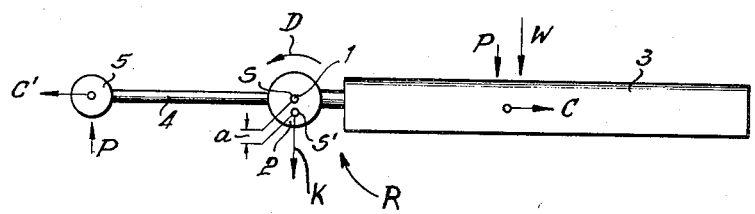
Fig. 1 is a schematic top view of a single blade rotor unit of a helicopter according to the present invention.

Referring now more particularly to Fig. 1, the single blade main rotor unit or assembly R consists of a blade 3 attached to and extending radially from a hub 2 mounted on a substantially vertical drive shaft 1 which, when driven, normally rotates in the direction of arrow D. To the side of hub 2 opposite the point of attachment of blade 3 there is connected an extension or cantilever 4, to the outer end of which a counterweight 5 is fixed.

The rotor assembly composed of the above described elements is connected to the drive shaft by means of a conventional universal joint (not shown in Fig. 1) to ensure that the lift forces do not impart any bending moments to the drive shaft. As the rotor assembly rotates it is subjected, inter alia, to forces which lie in or parallel to the plane of motion of blade 3. Thus, the centrifugal force C created in blade 3 is balanced by an oppositely directed centrifugal force C' created in counterweight 5.

The resistance W of the air which blade 3 encounters in its movement is, on the other hand, unbalanced. In a construction employing a fixed bearing for the rotor assembly, this resistance or force W imparts to the body or cabin of the helicopter through drive shaft 1 a shaking or rattling of a frequency corresponding to the rotational frequency of the rotor assembly.

However, when the rotor assembly is so supported in accordance with the invention that it can move at least relative to the passenger cabin or freight compartment of the helicopter with at least one component of its motion lying in or parallel to the plane of rotary movement of blade 3, then the air resistance force W during continuous operation, may be considered as being constituted by a force couple P—P which gives rise to a free turning moment in or parallel to the plane of rotation, and by a force K acting on hub 2 radially and centrally thereof, parallel and substantially equal to the air resistance force W.

The above-mentioned force K may be presumed to be a centrifugal force derived from a weight of suitable magnitude eccentrically attached to the hub. In order to prevent or inhibit transmission of rattling and shaking forces to the body of the helicopter through the drive shaft, said force K must be balanced out.

Such balancing may be effectuated by displacing the center of gravity S of rotor unit or assembly R from its usual location in the axis of drive shaft 1 to a point S', in order that the centrifugal force derived from the weight of the rotor assembly balances force K. If, for example, the flying weight of the helicopter is approximately 500 kg. and the rotor assembly rotates at approximately 250 r.p.m., then the distance $a$ (Fig. 1) from point S to point S' should be approximately 7 to 8 mm. When the construction thus permits a revolving of S' about S, no shaking or rattling will be transmitted to the body of the helicopter.

Figure 2:
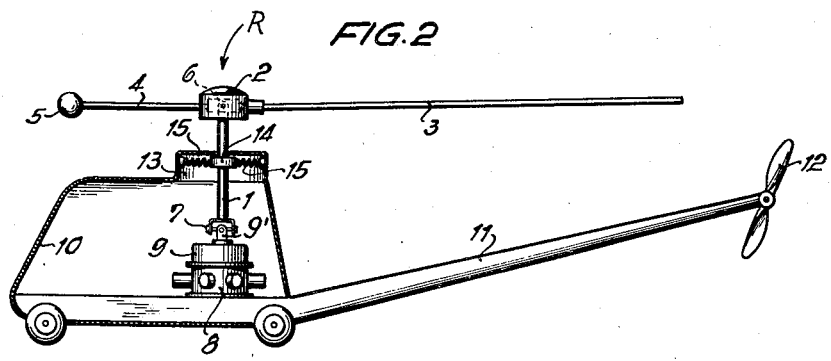
Fig. 2 is a side view of one embodiment of the helicopter according to the present invention, certain of the interior parts being shown.

Referring now to Fig. 2, it will be seen that drive shaft 1 is adapted to move relative to the body of the aircraft by means of the universal joint and associated springs. The main rotor assembly R, which consists of blade 3, hub 2, cantilever or extension 4, and counterweight 5, is connected to drive shaft 1 by means of a universal joint 6. On the housing of a drive motor 8 is mounted a gear box or transmission unit 9 from which a driving or connecting pin 9' projects, said pin being connected to drive shaft 1 by means of a universal joint 7.

Motor 8 is supported in body 10 of the helicopter which additionally is provided with a tail-like extension 11 supporting an air screw 12 at its outermost end to provide, in a known manner, a counter-moment to the turning moment of the main rotor unit or assembly. In effect, therefore, body 10 and the parts connected therewith are supported from the rotor unit by means of universal joint 6, shaft 1, and universal joint 7.

Disposed on top of body 10 is a neck or turret 13 in which are mounted a pair of springs 15 which in turn support a bearing 14 through which shaft 1 passes. Suitable means (not shown) may be provided to automatically or otherwise adjust the tension of springs 15 or to limit the displacement of shaft 1 relative to body 10, whereby a continuous control of the actions of rotor assembly R can be achieved.

The center of gravity of the suspended masses, i.e., of the cabin, the tail, and associated parts, should lie preferably in the universal joint 7. If the suspension is effected without springs, however, such center of gravity must lie beneath universal joint 7. Springs 15 are so selected or adjusted that the natural oscillation frequency of the swinging system is less than the rotational frequency of the rotor unit, in order that no resonance can occur during flight.

Inasmuch as the oscillations which cause the rattling or shaking have their greatest amplitude longitudinally of the body of the helicopter as determined by tail 11, while transversely thereto only smaller oscillations occur, it is generally sufficient to arrange springs 15 or like elastic elements between the wall of body 10 and floating bearing 14 only longitudinally of the helicopter. The springs or elastic elements may, however, be distributed around drive shaft 1 and may be of different strengths or tension characteristics in the manner necessitated by the amplitudes of the oscillations corresponding to the various angular positions of the rotor blade relative to the longitudinal axis of the helicopter.

Figure 3:
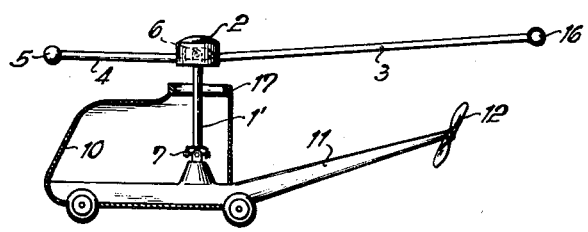
Fig. 3 is a side view of another modification of a helicopter according to the present invention.

In the modification according to Fig. 3, the drive shaft is replaced by a tubular suspension member 1' which is connected to the rotor unit by means of a universal joint 6 and to the floor of body 10 by means of a universal joint 7. The rotor unit is substantially the same as that illustrated in Fig. 2, but includes additionally a jet engine 16 attached to the outer or free end of blade 3 for rotating the unit, the engine being oriented substantially tangentially to the path of movement of said outer end. Suspension member 1' may in this case be permitted to swing or oscillate freely.

In order that the suspension member and the rotor should not assume an undesirable and excessively inclined position when the helicopter is not in motion, there is provided an abutment member, such as ring 17 in body 10, through which ring the suspension member extends. Ring 17 is sufficiently large in diameter to enable member 1' to achieve its full range of movement.

In contradistinction to the embodiments of Figs. 2 and 3, in the modification according to Fig. 4 only the passenger cabin 10', which is shown as being provided with windows 20, seats 21, and back rests 22, is kept free of oscillations. Cabin 10', from which tail assembly 11'—12 extends, is connected by means of a universal joint 7 to a suspension member 1" which in turn is connected to the rotor unit by means of universal joints 19 and 6 disposed at opposite ends of a connecting link 19'.

In this embodiment the landing assembly 18, which is relatively unaffected by vibrations and jarring oscillations, is directly supported from link 19', being connected to the latter between universal joints 6 and 19, with joint 19 being connected between the link and suspension member 1". A suitable abutment member, such as a ring 17', serves to limit and control the range of movement of suspension member 1" relative to cabin 10'. It is well understood that the movability of the universal joints 6 and/or 19 may be regulated in any known manner, such as by abutment means associated therewith.

As may be seen from Figs. 5 and 6, the element which corresponds to drive shaft 1 or suspension member 1' (1") may be stationarily disposed in body 10", if means are provided to ensure transverse movability of the rotor hub relative to said element. To this end, universal joint 6' of the rotor assembly is connected to a flanged bell 23 which in turn is supported by a plurality of resilient or elastic members 24 affixed to hub 2'.

This permits a lateral displacement of hub 2' and thus of the rotor assembly as a unit relative to said element and body 10". The extent of displacement of the rotor assembly may be controlled by suitable limiting abutment means, adjustable or otherwise (not shown), interposed in the path of movement of bell 23 or in the paths of distortion of elastic members 24.

Figure 7:
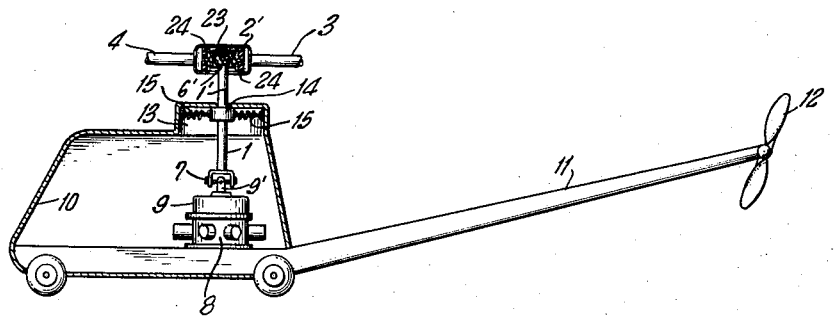
Fig. 7 is a side elevational view of a further modified form of the invention with parts thereof being shown in section.

Referring now to Fig. 7, it will be seen herein there is disclosed an embodiment of the invention employing a hub construction similar to that as is shown in Figs. 4 and 5, and having drive means similar to that shown in Fig. 2.

It will be readily understood that all of the rotor assemblies illustrated must conform, in the matter of mass distribution, to the principles set forth hereinabove with regard to Fig. 1. In any case, of course, the configurations of the rotor blade, counterweight, cabin, tail, and tail rotor will be determined according to standard aerodynamic principles depending on the flight characteristics sought to be attained.

Thus it will be seen that there has been provided, in accordance with the broadest aspect of the invention, a helicopter comprising a body, a tail assembly therefor, a main rotor assembly having a hub and a single rotor blade extending radially therefrom, said body and said tail assembly being operatively connected to said hub to permit the latter and said blade to rotate relative to said body and said tail assembly, drive means operatively connected to said rotor assembly for rotating the same, and means operatively interconnecting said rotor assembly and said body for permitting oscillatory movement of said rotor assembly as a unit relative to said body in such a manner that at least one component of said oscillatory movement lies in the plane of rotary movement of said blade, whereby transmission of undesirable vibrations to said body from said rotor assembly is reduced to a minimum.

Having thus described the invention, what is claimed as new and desired to be secured by Letters Patent is:

1. A helicopter comprising a cabin body, a tail assembly therefor, a main rotor assembly having a hub and a single rotor blade extending radially therefrom, said rotor assembly having its center of gravity offset from the axis of rotation of said hub to counterbalance the air resistance force on said rotor assembly, drive means operatively connected to said rotor assembly for rotating the same, universal joint means, and resilient means operatively interconnecting through said universal joint means said rotor assembly and said body for permitting oscillatory movement of said rotor assembly as a unit relative to said body in such a manner that at least one component of said oscillatory movement lies in the plane of rotary movement of said blade, whereby transmission of undesirable vibrations to said body from said rotor assembly is reduced to a minimum, said universal joint means being suspended by said resilient means.

2. A helicopter according to claim 1, said universal joint means including a flanged bell, said resilient means including a plurality of elastic members connected to said hub and supporting said bell, whereby said hub is laterally displaceable together with said rotor assembly relative to said cabin body.

3. A helicopter according to claim 2, at least some of said elastic members being disposed angularly relative to the longitudinal axis of said body.

4. A helicopter according to claim 2, at least some of said elastic members being disposed radially about said universal joint means and normal to the longitudinal axis of said body.

References Cited in the file of this patent

UNITED STATES PATENTS

| | | |
|---|---|---|
| 2,242,457 | Cierva | May 20, 1941 |
| 2,247,034 | Pitcairn | June 24, 1941 |
| 2,395,143 | Prewitt | Feb. 19, 1946 |
| 2,471,687 | Holmes | May 31, 1949 |
| 2,615,657 | Young | Oct. 28, 1952 |

FOREIGN PATENTS

| | | |
|---|---|---|
| 608,459 | Great Britain | Sept. 15, 1948 |